May 2, 1961 P. DE HERTEL EASTCOTT 2,982,897
DUAL-MOTOR A.C. DRIVE FOR AUTOMATIC HOISTS
Filed April 2, 1958 4 Sheets-Sheet 1

Inventor:
Peter deHertel Eastcott,
by Irving H. Marshman
His Attorney.

May 2, 1961   P. DE HERTEL EASTCOTT   2,982,897
DUAL-MOTOR A.C. DRIVE FOR AUTOMATIC HOISTS
Filed April 2, 1958   4 Sheets-Sheet 3

Fig.4.

Inventor:
Peter deHertel Eastcott,
by Irving H. Marshman
His Attorney.

Fig. 5.

Inventor:
Peter deHertel Eastcott,
by Irving H. Marshman
His Attorney.

2,982,897
DUAL-MOTOR A.C. DRIVE FOR AUTOMATIC HOISTS

Peter de Hertel Eastcott, Peterborough, Ontario, Canada, assignor to Canadian General Electric Company, Limited, Toronto, Ontario, Canada, a corporation of Canada Filed Apr. 2, 1958, Ser. No. 725,951

18 Claims. (Cl. 318—46)

This invention relates to alternating current dynamoelectric machine drive systems and more particularly to a reversible polyphase induction motor drive and associated control system which renders torque substantially independent of speed throughout essentially the normal speed and torque ranges of the drive.

As is well known in the electrical art, there are many applications (e.g. cranes, hoists, rolling mills, etc.) which require a drive system wherein the attainable torque is not in any way related to the speed of the drive over the entire forward and reverse range of operation. A drive meeting such requirements has previously been a direct current type, such as a D.C. shunt motor, which although possessing the desired operating characteristics, nevertheless exhibits certain short-comings in respect of design limitations, maintenance and capital expenditure. For instance, a D.C. motor is susceptible to commutation problems at high voltage or high speed, and the ever-present brush wear not only generates objectionable carbon dust but also presents an adjustment problem which becomes acute in high altitude installations. The widespread acceptance of alternating current as a source of electric energy relies on expensive conversion equipment in the form of rectifiers, dynamos, etc. to furnish the requisite direct current.

The induction motor represents a simple, rugged, and economical machine which will operate directly of the A.C. supply and for this reason has been adapted widely in industry. Although not possessing the more serious drawbacks of the D.C. motor, the induction motor exhibits certain major deficiencies of its own, the most serious drawback being that its speed and torque are intimately related, the motoring and braking characteristics are dissimilar and its direction of rotation cannot be reversed without first interrupting the power supply. Attempts to overcome such shortcomings and so adapt the induction motor to a reversible drive demanding a substantially independent torque/speed characteristic have entailed either introducing a variable external resistance into the rotor circuit or else varying the applied voltage, both expedients tending to sustain the rated torque over the entire speed range and vice versa. The injection of a variable negative sequence or "plugging" component into the normal positively sequencing polyphase electromagnetic field has been resorted to where progressive braking and/or reversal of the motor is to be effected.

Although the aforementioned partially remove the most prominent obstacles to a wider application of the induction motor, such remedial measures tend to give rise to subsidiary problems. For instance, a stepless variation in rotor resistance will result in a substantially stepless increase or decrease of motor torque, but it is practicable only through the use of externally disposed liquid resistors which are vulnerable to silting, freezing, evaporation, corrosion and other decalibrating agencies. Prior attempts to use external banks of "dry" resistors, which can be shorted out of the rotor circuit in successive sections, have usually relied on current responsive means such as contact-making voltmeters, wattmetric relays, current transformers or other relatively complex load-measuring devices to initiate the switching operation; an induction motor responding to such control means will produce torque that varies in steps according to the change of resistance. Attempts to vary the applied voltage and thus control the motor torque independently of speed generally comprised connecting a balanced array of saturable reactors in the polyphase line in series with the motor field coils. This arrangement involves the expense of providing, in triplicate, saturable reactors insulated to line voltage and containing sufficient iron and copper to carry respectively the full line voltage and current. Superposition of a negatively sequencing or "plugging" component on the normal positively sequencing or "motoring" polyphase rotating field is identical to imposing an unbalance on the polyphase supply lines, and such unbalanced injection is generally accomplished by a saturable reactor connected in one lead of the polyphase supply line, the amount of unbalance or "braking" component present being controlled by the degree of saturation of the reactor. In circumstances where the negative sequence component is required to be increased sufficiently to overcome the positive sequence component and thus cause reversal of motor rotation, a pair of leads in the supply lines have saturable reactors serially connected therein and a further pair of saturable reactors cross-connected between said leads. During normal operation the series reactors are kept saturated and thus present negligible impedance to the current flow; the cross-connecting reactors are left unsaturated in order to provide a high impedance circuit between their respective leads and thus minimize the current flow therebetween. By desaturating the series reactors the motor is in effect disconnected from the line, and by then saturating the cross-connecting reactors to lower their impedance, the latter act as changeover means, which in effect reverse a pair of leads to the motor field winding without a mechanical interruption of the circuit. The saturating windings of the series reactors may have their controls "ganged" to those of the cross-connected or changeover reactors whereby progressive desaturation of the series reactors results in a concomitant saturation of the changeover reactors. Thus the series reactors may progressively reduce the positively sequencing component of current available for motor rotation in one direction, while the changeover reactors allow passage to the motor field of a progressively increasing component of polyphase current whose rotation sequence is reversed, or negative with respect to the motor rotation. Although such a saturable reactor system permits the motor to smoothly slow down to standstill and then reverse its direction of rotation, the comparatively large number of highly rated reactors required results in a bulky installation, and the utilization of a negative sequence component produces harmonics which evoke excessive heating in the motor. Furthermore, since the counter-torque or "drag" produced by such plugging methods is substantially unaffected by the speed, stability of motor operation can be achieved only by the provision of a degenerative feedback in the form of additional equipment which will render the unbalance a function of the drive speed. As an alternative to plugging, dynamic braking has also been resorted to and comprises superimposing an electromagnetic field of either D.C. or zero sequence A.C. (i.e. single phase) on the rotating field in the motor which causes rotation of its rotor. Besides requiring additional equipment in the form of either a D.C. exciter or rectifier, D.C. dynamic braking either results in over-rating of the motor or else necessitates the difficult procedure of changing connections while the motor is loaded. In contrast, A.C. dynamic braking, although it can be readily applied, develops a rather limited amount of braking torque.

Dual-motor drives, consisting of A.C. reactors interconnected electrically and/or mechanically have been resorted to in an attempt to surmount the aforementioned subsidiary problems in achieving functional characteristics somewhat similar to those of a single A.C. motor having a controlled amount of unbalance in its field. In its broadest aspect such a system utilizes one motor as an auxiliary when the load is too heavy for the second motor, and as an artificial load when the load is too light. Thus the torque of the second motor may be applied to that of the first in whatever sense is necessary to correct any deviation in speed of the drive from that of a predetermined program.

Although numerous methods have been proposed for achieving such artificial mechanical loading, such methods have often suffered from over simplification whereby they were unable to adequately perform their intended functions. For instance, the main motor has sometimes been rated to handle the maximum intended load without any provision for applying a reduced torque to lesser loads. Since the auxiliary motor must always supply an "artificial" load representing the difference between the load on the main motor and that of the drive, it is apparent that the auxiliary motor must often carry a load which is not only excessive but also entirely unnecessary. Since artificial loading gives rise to loss of power in the form of mechanical counter-torques and sometimes as electrical circulating currents between the respective motors it will be apparent that unnecessary artificial loading is to be avoided if at all possible. In many cases artificial loading schemes have achieved their intended objectives under the penalty of excessive complexity. It is thus seen that prior efforts to extend the possible applications of the induction motor by eliminating its less desirable traits have generally been of dubious merit, achieving the desired objective only by resorting to elaborate systems incorporating A.C. equipment whose expensiveness and complication tends to make them even less attractive than the systems which they were intended originally to supplant.

Accordingly, a primary object of the invention is to provide a reversible polyphase A.C. drive and associated control system which renders torque and speed mutually independent throughout substantially the normal speed and torque ranges of the drive.

It is a further object of the invention to achieve independent speed/torque characteristics in a polyphase induction motor drive without resorting to either plugging the motor or modulating the line A.C. voltage.

It is also an object of the invention to achieve reversed rotation of a polyphase induction motor drive without the necessity of introducing any negative sequence components thereinto and thus unbalancing the line and/or overheating the motor.

It is furthermore an object to provide a simple and economical induction motor drive system capable of replacing D.C. shunt motor drives in their presently accepted applications without resort to the expense of saturable reactors.

It is likewise an object of the invention to minimize the interplay of counter-torques within a dual motor drive and thereby avoid unnecessary power losses.

It is further germane to the invention to provide degenerative feedback in the form of D.C. dynamic braking and to ensure that said feedback is substantially linear and is utilized to maximum efficiency regardless of the speed of operation of the drive.

It is a subsidiary object of the invention to provide means to prime an A.C. drive prior to the release of the friction brakes to thereby overcome inductive effects and ensure a rapid initial response to the regulator on starting a trip.

It is also a subsidiary object of the invention to ensure that the auxiliary motor achieves the requisite amount of artificial mechanical loading by resorting to regenerative braking whenever possible, rather than to dynamic braking.

It is ultimately an object of the invention to provide an inexpensive dual-motor A.C. drive amenable to pushbutton operation, whereby automatic control of a mine hoist may be achieved.

Briefly the invention relates to a system of utilizing A.C. wound rotor induction motors in a drive designed to develop substantially infinitely variable control of torque from full load motoring to full load braking when the machines are operating anywhere within a speed range of from full load slip r.p.m. up to synchronous speed minus full load slip r.p.m.

A feedback control system is used to speed regulate a driven load to within a small percentage error of a preselected speed. In situations where the acceleration and deceleration of the driven load must be held to a definite speed-time or speed-displacement pattern, this may be achieved with an accuracy heretofore beyond the capabilities of conventional A.C. drives used in the electrical art. In this respect the subject system seriously challenges the flat speed/torque characteristics of D.C. adjustable voltage equipment presently recognized by the industry as providing the optimum in the precise control of torque and speed.

A particular application of the invention resides in electric drives for mine hoists. In such drives where automatic operation is desired without the assistance of an operator, it is essential that the drive employed be capable of following either a speed-time or speed-displacement program, and while holding the speed of the load to this program or reference value, the drive may be called upon to deliver torque to the load ranging from full capacity motoring to full capacity braking. For this reason alone, A.C. mine hoist drives have always been considered inferior to their more flexible D.C. counterparts, since when operating below synchronous speed, the wound rotor induction motor cannot, without an interruption and reversal of power supply and rearrangement of controls, pass from a braking to a motoring state. To overcome this deficiency two A.C. wound rotor induction motors are employed, geared to the hoist in 1:1 ratio. However, this 1:1 ratio is not necessary, and if desirable, a more suitable ratio may be used. The operation is electrically programmed so that at all times one motor is available for delivering positive or motoring torque while the other is available for delivering either driving or electric braking torque. In this scheme, the two A.C. motors comprising the electric drive will hereinafter be referred to as the main motor and the auxiliary motor. In the most economical arrangement of this drive system the main motor has approximately double the torque capacity of the auxiliary motor and approximately four times the thermal rating of the latter; there is, however, nothing to prevent the use of two motors of equal size and thermal capacity where the installation warrants their use. Under motoring conditions both the auxiliary and main motor drive the hoist. Under braking conditions, the auxiliary motor continues to drive the hoist while the main motor supplies dynamic braking.

For a fuller apprecation of the aims and objects of the invention, reference should be made to the ensuing description and drawings in which.

Although the invention will be described with reference to an embodiment thereof which is particularly applicable to mine hoists it will be understood that this has been done for illustrative purposes only and is not intended to represent the sole mode of putting into effect the principles of the invention.

Figure 1:
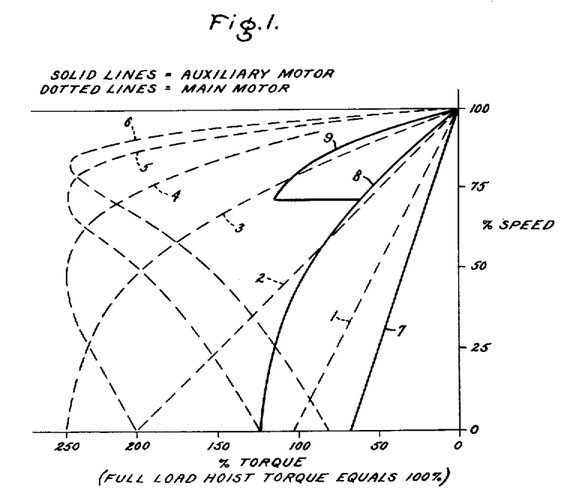
Fig. 1 shows the characteristic speed/torque performance curves obtained during motoring of both the main and auxiliary induction motors employed in the invention.
Figure 4:
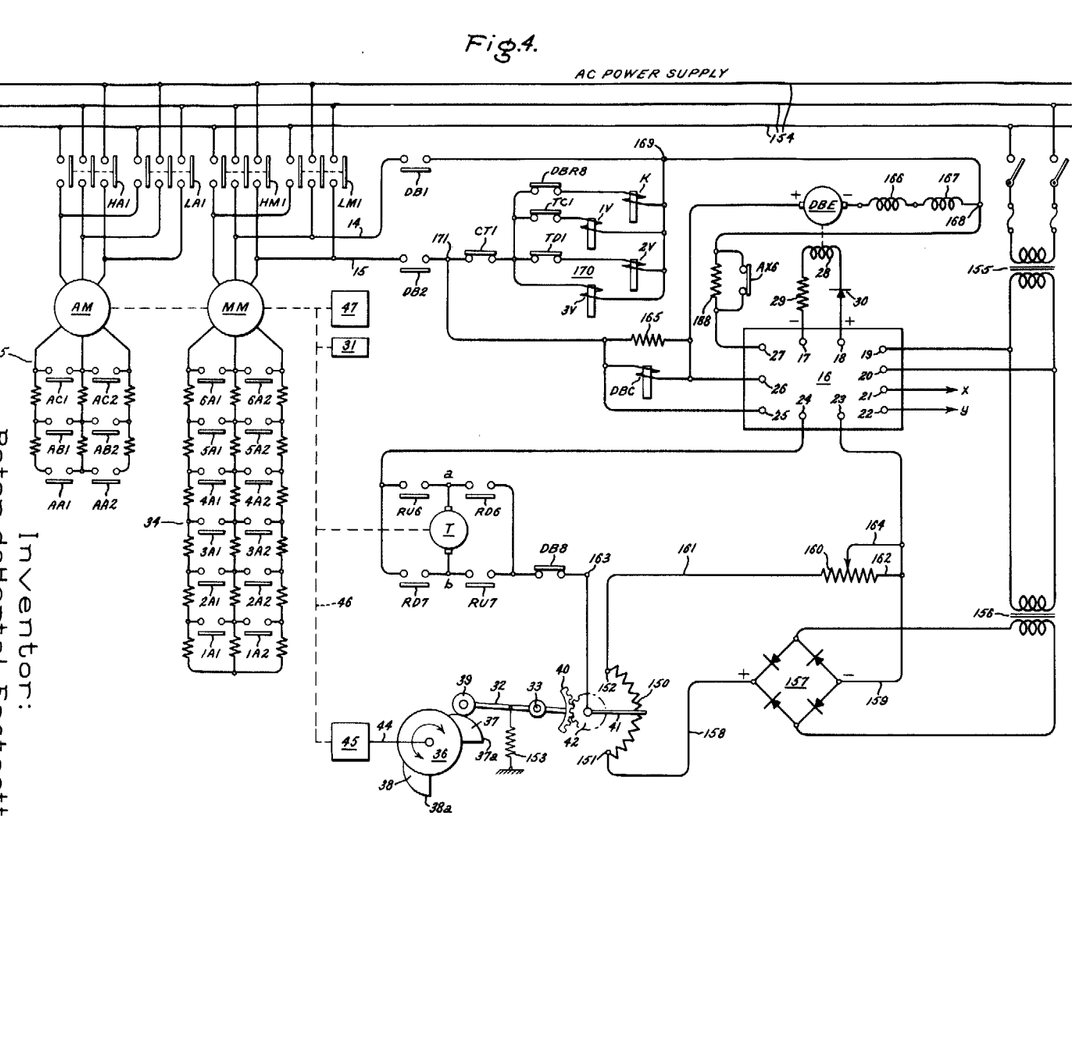
Fig. 4 is a schematic layout of the improved induction motor drive system of the invention.

The speed/torque characteristics of the main and auxiliary motors are depicted in Figure 1 of the drawings. The broken curves labelled 1 through 6 show the speed/torque characteristics of the main motor MM when operating with various amounts of resistance in its rotor or secondary circuit; while the solid lines 7, 8 and 9 show the generally similar speed/torque characteristics of the auxiliary motor AM when likewise operating with various amounts of resistance in its secondary circuit. The general arrangement of the secondary resistors is shown in Figure 4, where, for example, it will be seen that when the main motor MM is operating on characteristic 6, its secondary resistor bank 34 will be completely removed from its secondary circuit by closed contacts 6A1 and 6A2 of relay 6A. All of the curves shown in Figure 1 are plotted to the same scale; it has been assumed that 250% torque represents the maximum motoring or braking torque which the drive will ever be required to deliver.

Figure 2:
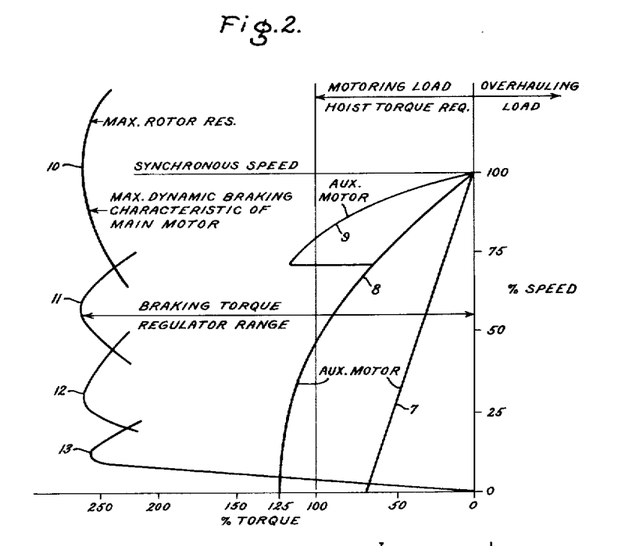
Fig. 2 shows the characteristic speed/torque performance curves obtained when the main motor is switched to operation under D.C. dynamic braking.

Figure 2 of the drawings, shows the speed/torque characteristics obtained when the main motor is placed on dynamic braking, its braking torque being indicated by the envelope of curves labelled 10, 11, 12 and 13. When the main motor is employed for dynamic braking, a D.C. current is circulated through its stator windings through conductors 14 and 15 to set up a stationary magnetic field of variable intensity in the stator core of the machine. If the motor is running, the conductors of its rotor will cut the stationary flux set up by the D.C. current in the stator windings and so induce an alternating E.M.F. in the rotor conductors which will in turn appear at the rotor slip rings. The generated voltage appearing at the slip rings of the rotor will cause a current to flow through one or more sections of the secondary resistor bank 34 of a value depending upon the instantaneous slip-ring voltage and the value of the connected resistance which in turn depends upon the number of contacts 1A1, 1A2, 2A1, etc. which are closed. It is a fundamental fact in induction motor theory that for any given rotor speed there exists a critical value of secondary resistance which alone will enable the motor to deliver the maximum torque per ampere of current flow in the rotor conductors. As an illustration of this phenomena, with respect to dynamic braking of the main motor MM, it is shown in Figure 2, that, with an amount of secondary resistance 34 in the rotor circuit to give characteristic 11, the motor will deliver a maximum shaft torque per ampere of rotor current flowing in its windings when passing through approximately 60% of rated speed; it should be observed that although the rotor current may remain substantially constant, the torque builds up to this optimum value at 60% speed and then falls off again as the machine continues to slow down. To minimize motor heating it is highly desirable when dynamic braking with the main motor, to operate the machine as close to its maximum torque per ampere secondary resistance value as is possible at all speeds since the smaller the current required to produce the necessary braking torque, the less the heating that occurs. A feature of this system of control is a centrifugal speed detector switch 47 (Figures 4 and 5), which during the braking process, automatically switches the secondary resistance of the main motor directly as a function of speed, giving in succession during slow-down the characteristics 11, 12 and finally 13 as the rotor approaches a condition of rest. The number of switching positions used may be varied for a particular application, and a switch designed accordingly. The type of switch employed may be a centrifugal mercury switch of the type employing a number of mercury switch envelopes mounted on a turntable which rotates with the hoist drive. Hence, this method of dynamic breaking of a wound rotor induction motor gives highly efficient performance since at no time is the machine allowed to operate very far from its optimum torque per ampere or rotor power factor. In practice, the speed switch points are adjusted to give smooth transition from one braking curve to the next at approximately 150 percent of rated main motor torque.

With the secondary resistance value under control of the speed detector switch 47, the intensity of dynamic braking torque provided by the main motor MM will vary directly as a function of the magnitude of the D.C. currents circulated through the stator windings via conductors 14 and 15. By maintaining the application and magnitude of D.C. current applied to the stator windings under the control of a regulator, the braking curves as shown on Fig. 2 may be moved in and out along the torque axis to provide infinitely variable control of the braking torque as called for by the regulator. At the same time the maximum torque for the particular speed range is obtained by the action of the speed detector switch. To provide the necessary regulator control for this process, a regulator such as a magnetic amplifier 16 is employed whose output at terminals 17 and 18 is fed to field 28 of a dynamic braking exciter DBE to control the voltage of DBE and in turn the D.C. current therefrom flowing in the stator windings of the main motor MM. The regulator is made responsive to the instantaneous error signal existing between the predetermined speed pattern or profile shown in Fig. 3 and the actual speed of the hoist in such a manner that when the hoist speed exceeds the predetermined speed profile, the regulator will proportionately build up voltage on the dynamic braking exciter and this will in turn produce a proportionately greater braking effect by the main motor. Conversely, when the hoist speed falls below the speed called for by the speed profile, the error signal fed to the regulator then becomes negative. The inherent characteristics of a magnetic amplifier are such that it will accept a signal of the opposite polarity. When the error signal becomes negative it is rejected by the magnetic amplifier 16 and no current is therefore supplied to the field of DBE so that no current is delivered by DBE to the stator windings of the main motor. As added protection against a reversal of current to field 28 a rectifier 30 may be placed in circuit between regulator 16 and field 28 to block out such a reversal should it appear at terminals 17 and 18. When the error signal is negative, the hoist is thus allowed to regain its desired velocity as called for by the speed profile.

As used on a mine hoist, the basic principle upon which this drive regulator operates is as follows:

The auxiliary motor AM is used to deliver a positive motoring torque only. When lifting a load with the hoist, the auxiliary motor AM and the main motor MM, which are mechanically coupled together and to the hoist drive mechanism, both exert positive torque to bring the machinery up to a predetermined speed and maintain it at this value. During deceleration, the auxiliary motor continues to deliver a controlled positive or motoring torque while the main motor is switched over to dynamic braking under the control of the magnetic amplifier braking regulator system. Normally the hoist will accelerate under the influence of gravity when opposed by the driving or positive torque of the auxiliary motor only. Should the hoist not have a sufficiently low rate of deceleration under the action of gravity as called for by the decreasing speed profile, the dynamic braking regulator will apply braking to the hoist through the regulator building up a voltage on the dynamic braking exciter DBE which in turn circulates current through the main motor stator windings. Thus the two motors work in controlled opposition during deceleration and as explained previously the dynamic braking regulator can produce an infinitely variable control of the braking torque offered by the main motor over a torque range of from zero to approximately 250% of drive rating. It is not believed that there is at present on the market any infinitely variable control of dynamic braking using dry type resistors. The only known type of infinitely variable control available uses water rheostats which are susceptible to silting, freezing, corrosion, etc. The infinitely variable torque control of this invention is capable of bringing the drive to rest under all conditions. It is undesirable to have the auxiliary motor AM deliver more torque than necessary to maintain the load on the predetermined speed profile because any excess torque from this motor must be counteracted by torque from the main motor MM. Any excess torque output of the auxiliary motor is limited by a control scheme which automatically reduces it during deceleration by means of a voltage responsive relay system 170 in the dynamic braking circuit. Hence, if a predetermined amount of dynamic braking is exceeded the over voltage relays will operate to switch the auxiliary motor secondary resistors 35 onto a different operating characteristic calling for less torque at a given speed.

It should be carefully noted that at no time is either motor "plugged," i.e. operated with its stator connected to the A.C. supply lines in such a manner as to produce a revolving field rotating in the opposite direction to its rotor. This is often resorted to in existing A.C. machine systems but it is definitely to be avoided if at all possible, since it produces excessive currents resulting in undesirable heating in both the secondary resistors and the machines themselves.

It is an additional feature of this system, that since the auxiliary motor is chosen to be capable of delivering at least 125% of the full load torque requirements of the hoist, the auxiliary motor is actually capable of moving the hoist without any assistance from the main motor. This is important because when a loaded skip is brought into the dumping horns on landing, there is a good possibility in prior art schemes using independent motors that the drive will stall before the skip reaches its final destination, since the main motor is on dynamic braking and therefore unable to contribute any positive motoring torque. However, in this system the auxiliary motor is always energized and will automatically deliver the necessary torque to bring the skip to the desired position.

Figure 3:
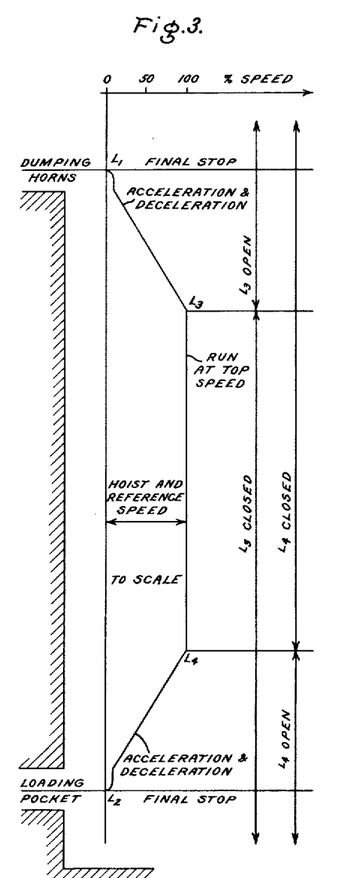
Fig. 3 illustrates a speed/distance program typical of those to which the drive may be expected to conform.

It has been assumed in the embodiment disclosed that the hoist is required to follow the speed distance profile as shown diagrammatically in Figure 3. The hoist, when lowering a load, must automatically stop opposite the loading pocket, and when lifting a load it must stop opposite the dumping horns; limit switches $L_2$ and $L_1$ in the shaft for example, or limit switches illustrated by 31 geared to the hoist initiate such stops. As the skip or cage leaves either station, a short run will be made at reduced speed as shown in Fig. 3, whereupon a predetermined acceleration pattern will bring the hoist up to top speed. A short run is provided on the speed profile at both ends thereof so that it is made available when the skip starts from either the top or the bottom. It is desirable that, as the hoist starts, some time is made available to detect the presence of an overhauling load before the hoist speed becomes too high in order that dynamic braking may be introduced while the hoist is still moving slowly. An overhauling load may readily occur in a double skip arrangement, i.e. one at each end of the rope as in a Koepe pulley system. If the skip at the bottom is lightly loaded and the skip at the top is carrying a heavy load, then overhauling load conditions might exist. The low speed region at each end of the speed profile also provides a levelling run for the skip as it enters the dumping horns or loading pocket. The stopping distance will be essentially constant since the speed will always be constant and it is therefore a simple matter to locate the limit switch $L_1$ or $L_2$ at a position in the shaft to ensure that the skip comes to rest at the required landing position.

A speed profile or program of the form illustrated in Fig. 3 may be established by a device of the type shown in Fig. 4 comprising a cam disc 36 mounted on a shaft 44 and driven by a gear box 45 which is coupled mechanically to the hoist drive. A cam segment 37 adapted to provide for the slowdown of the hoist on approaching the dumping horns is secured to disc 36 and adjustable with respect thereto. A similar segment 38 provides for the slowdown of the hoist on approaching the loading pocket. It is to be noted that each of the cam segments 37, 38 is provided with a short circular zone designated 37a and 38a respectively concentric with the periphery of disc 36; these segments control the slow starting and landing speeds. A cam follower 39 rides on the periphery of segments 37 and 38 of disc 36. An arm 32 pivoted at 33 translates the movement of follower 39 to a rotatable slider 41 on potentiometer 150 through a rack 40 whose teeth mesh with the teeth of a pinion 42 secured to the slider. A spring 153 acting through arm 32 maintains the follower 39 in contact with the cam surfaces at all times. In the apparatus shown in Fig. 4 the hoist is depicted as accelerating during lowering thereof at approximately half speed, the follower 39 having descended part-way down the slope of segment 37 toward the periphery of disc 36. As the cam follower 39 moves downward the rack 40 moves upward to thereby rotate pinion 42 and cause slider 41 to move toward the end 151 of potentiometer 150. When operating in the immediate vicinity of either of the zones 37a, 38a roller 39 rides on the radius afforded by cam section 37 or 38 and potentiometer slider 41 will move toward position 152, and during this time the conveyance will either accelerate or decelerate. A.C. power from the main three phase power supply lines 154 is fed to a step-down transformer 155 and from there to a voltage stabilizing transformer 156, which in turn applies a constant potential A.C. output to a full-wave bridge type rectifier 157. Rectifier 157 rectifies the A.C. output of the stabilizing transformer and applies a constant voltage D.C. supply to lines 158 and 159. It will be seen that this constant direct current is fed to the potentiometer 150 and resistor 160 in series via circuit elements 158, 151, 152, 161, 162 and 159. As the conveyance moves through its shaft the cam disc 36 follows this motion and by means of the foregoing mechanical and circuit elements a voltage profile is generated which represents or corresponds with the speed profile shown in Figure 3. When the conveyance is opposite either landing, arm 41 will be in position 152 and the only voltage drop between terminal 163 and line 159 will be that occurring across the portion of resistor 160 which is in circuit with lines 161 and 164. This provides a small slow-running or levelling speed reference voltage necessary to insure that the conveyance approaches the top and bottom landings at a slow, safe speed. Resistor 160 is adjustable so that the levelling speed may be varied as required. As the conveyance moves from either landing toward the center of the shaft, arm 41 on the potentiometer 150 moves away from position 152 toward 151, and the voltage between terminal 163 and line 159 will build up correspondingly until the top speed value is reached. In this manner, the device just described provides a voltage-distance program corresponding to the desired speed-distance profile as shown in Figure 3. It is to be noted that the conveyance is either accelerating or decelerating when follower 39 rides on cam segments 37 and 38 proper and travelling at constant top speed when follower 39 rides on the periphery of disc 36.

A. D.C. tachometer generator T, also geared to the hoist by shaft 46, is connected in series bucking circuit relationship with the reference voltage between terminal 163 and line 159 through terminals 24 and 23 of a magnetic amplifier 16. Since the tachometer generator is directly coupled to the hoist drive its voltage polarity reverses with reversal of the drive. Normally open contacts RU6 and RU7 of relay RU close when the run-up circuit is energized to connect the tachometer in circuit with terminals 163 and 24. When the drive reverses contacts RU6 and RU7 again open and normally open contacts RD6 and RD7 of relay RD close to reverse the relationship of terminals a and b with respect to terminals 163 and 24. The tachometer generator voltage polarity is therefore the same at all times and in such a direction that it opposes that of the references voltage of potentiometer 150 and resistor 160. When the tachometer generator voltage exactly equals that of the reference voltage, since the two are in opposition, there will be no net voltage between terminals 24 and 23 and hence no current will flow through amplifier 16. However, if the voltage output of the tachometer generator rises above the reference value developed by potentiometer 150 and resistor 160, a current will circulate in the closed loop containing the series connected tachometer, amplifier, and potentiometer and will be amplified by magnetic amplifier 16 to build up a voltage at terminals 17 and 18 thereof. Since terminals 17 and 18 are connected to field 28 of a dynamic braking exciter DBE, it in turn will circulate a current through the stator windings of the main motor MM to produce the increase in braking torque necessary to reduce the speed of the hoist to that called for by the speed profile and thereby bring the tachometer generator voltage back to the reference signal. If the tachometer generator voltage falls below the reference voltage, due to the speed of the hoist falling below that called for by the program, a reversal of polarity of the signal to the magnetic amplifier 16 occurs but due to the inherent characteristics of the magnetic amplifier such a signal is rejected by the amplifier. Exciter DBE cannot therefore generate any voltage so that no dynamic braking will be applied. The braking torque provided by the main motor MM is purely a function of its speed, its rotor resistance, and the amount of D.C. current which is circulated through its stator windings.

The dynamic braking torque is always in such direction as to produce a braking effect which tends to bring the rotor of MM to rest irrespective of the direction or sense in which the D.C. current is circulated through the stator windings of the machine. For this reason, those skilled in the art will appreciate that it is necessary in this regulator scheme to prevent the magnetic amplifier from building up voltage on the dynamic braking exciter in the reverse direction when the hoist speed is actually below that of the speed profile because a reverse voltage at the exciter would lead to a further reduction in speed in direct opposition to the result which is desired. Such a unidirectional build-up of voltage in the dynamic braking exciter is not possible because the magnetic amplifier will not respond to an error signal of reversed polarity and hence no current will flow from terminals 17 and 18 to field 28. In essence, the magnetic amplifier 16 in combination with an additional safety feature such as a rectifier 30 provide an effective valve action to maintain the output of the dynamic braking exciter truly unidirectional, and in this way imparting "sense" to the regulator to ensure that it does not apply braking effect to the hoist when the hoist speed and thus the tachometer generator voltage drop below that called for by the program.

The negative terminal of exciter DBE is connected in series with auxiliary exciter field windings 166 and 167 to a terminal 168, and at terminal 168 the circuit divides with one lead going to a resistor 188 and from there to terminal 27 on the magnetic amplifier. The other lead connects terminal 168 to a terminal 169 on a relay control circuit indicated generally by numeral 170. The positive terminal of exciter DBE is connected in series with a resistor 165 to terminal 171 also on circuit 170. Leads 14 and 15 through which D.C. is supplied to the main motor from the exciter are interconnected with terminals 169 and 171 respectively through contacts DB1 and DB2 respectively of relay DB.

Due to the fact that the resistance of the main motor windings changes with variations of temperature therein it is desirable to control the output of the dynamic braking exciter in a manner which will compensate for such changes in resistance. Since the current flow from exciter DBE to the main motor windings also passes through resistor 165 there will be a voltage drop across the resistor. This voltage can be applied to the magnetic amplifier at terminals 25 and 26 and in response thereto the amplifier will modify its output to field 28, in particular the top 10% of its output, thus compensating for changes in resistance of the main motor windings by altering the output of exciter DBE. A circuit across the output of exciter DBE including a series connected current limiting resistor 188 and terminals 27 and 26 enables a voltage from exciter DBE to be fed back to amplifier 16 for control purposes. When the hoist conveyance is stationary resistor 188 is shunted by normally closed contacts AX6 of relay AX, but these contacts open when the motors are energized to place the conveyance in motion. If necessary, a resistor 29 may be placed in series with field coil 28 to limit the current from the amplifier to the field of the exciter.

Figure 5:
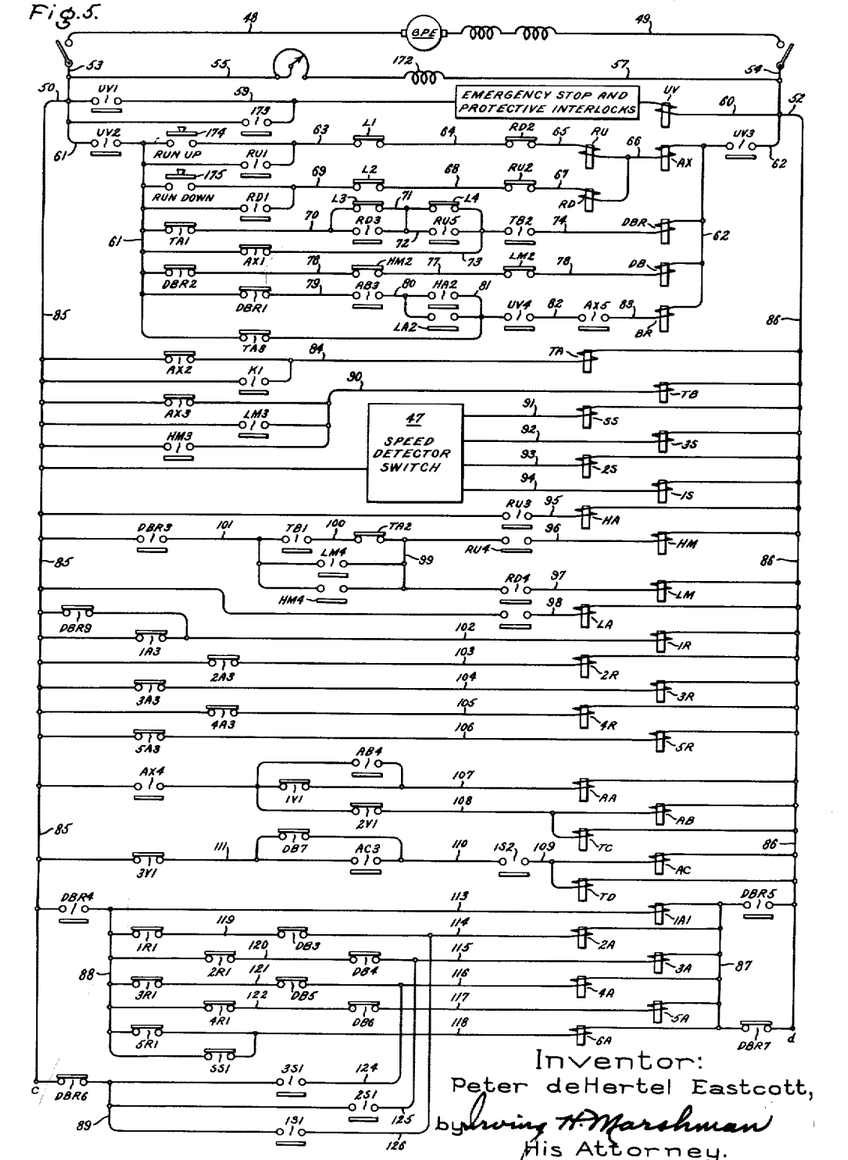
Fig. 5 is a circuit diagram of a control system which may be used with the drive system shown in Fig. 4.

The electromagnetic relays and switching contacts necessary for the operation of the hoist in accordance with this invention are shown in Figure 5. A constant potential general purpose exciter GPE supplies power to bus bars 85 and 86 to operate the electromagnetic relays. This machine is a flat compounded D.C. generator whose shunt field 172 is fed from its own armature voltage through leads 48, 53, 55, 57, 54 and 49. The generator is connected to buses 61 and 85 by means of leads 48, 53 and 50 and to buses 62 and 86 by means of leads 49, 54 and 52. An undervoltage relay UV is connected across the exciter bus 61—62 through leads 59 and 60. All the emergency stop buttons and protective interlocks required for a particular installation are wired in series with relay UV whose function is to create an emergency stop of the hoist in the event of a power failure or the opening of one of the protective interlocks. In the event that relay UV has become de-energized, it is necessary to close the manual reset contacts 173 momentarily to energize coil UV and enable it to complete a holding circuit through its own normally open contact UV1.

In the discussion to follow the relay coils will be designated by one or more letters, such as "relay UV," and the contacts associated with the relay will be designated by these same letters and a number, such as "contacts UV1, UV2 and UV3." A pair of normally open contacts (i.e. the normal position of the contacts when the relay coil is de-energized) are shown in the drawings as two stationary contacts and a movable bridging contact member spaced therefrom while a pair of normally closed contacts (i.e. the normal position of the contacts when the relay coil is de-energized) appear as the same two stationary contacts bridged by a movable contact member. The expression "relay drops out" is intended to mean that the coil of the relay has been de-energized which, of course, will be followed by its contacts returning to their normally open or closed positions, and the expression "relay picks up" is intended to mean that the coil of the relay has been energized.

The contacts UV2 and UV3 of relay UV complete with blowout coils are connected in a section of the exciter bus as shown in Fig. 5 so that bus sections 61 and 62 receive power from the exciter only when relay UV is energized and its contacts closed.

The operation of the hoist control system is as follows.

*Hoisting a load*

The hoisting cycle is initiated by pressing the run-up button 174, momentarily completing the circuit from bus 61 through leads 63, 64 and 65 to pickup relay RU, through lead 66 and to pick up auxiliary relay AX and then to exciter bus 62. Normally open contacts RU1 of relay RU close a circuit around the run-up button thus providing a holding circuit from bus 61 to lead 63 after the run-up button is released. Final stop limit switch L1, which has normally closed contacts connecting lead 63 to lead 64, will remain closed until the hoist reaches the dumping horns at the top of the shaft but its contacts will then open and stop the hoisting cycle. Normally closed contacts RU2 of relay RU between leads 68 and 67 open to prevent the possible pickup of relay RD simultaneously with RU. Normally closed contacts AX1 of relay AX between bus 61 and lead 73 open to de-energize dynamic braking relay DBR, the contacts TB2 being closed because relay TB has not yet timed out. It is to be observed that the connection between conductors 61 and 70 is already open through the time closing contacts TA1 of timer TA. During standstill of the hoist the coil of timing relay TA is energized through normally closed contacts AX2 from the bus bars 85 and 86, and these contacts remain closed until relay AX is energized. The opening of normally closed contact AX2 between bus 85 and lead 84 de-energizes relay TA which after a time interval of 1.5 seconds will allow its armature to release thus opening its normally open contacts and closing its normally closed contacts. Similarly normally closed contacts AX3 between bus 85 and lead 90 de-energize relay TB and start it timing out which will be completed in approximately 3.5 seconds. Normally open contacts RU3 of relay RU close to complete the circuit from bus 85 to lead 95 to pick up auxiliary motor primary relay HA so as to place the auxiliary motor AM on the power line 154 through contacts HA1 and thereby cause the motor to move the hoist in an upward direction, accelerating it along the speed profile curves as illustrated in Fig. 3. Normally open contacts AX4 of relay AX between bus 85 and lead 107 close when AX is energized and a circuit is completed through normally closed contacts 1V1 of voltage relay 1V. Relay AA is thereby energized and in like manner relay AB is energized through normally closed contacts 2V1 of voltage relay 2V between bus 85 and lead 108. Energization of relays AA and AB close contacts AA1, AA2, AB1 and AB2 in the rotor circuit of the auxiliary motor AM, and the motor will now operate along characteristic 8 as shown in Fig. 1 because contacts AB1 and AB2 complete the circuit for the star point thus placing the upper half only of the bank of resistors 35 in the secondary of motor AM.

The mechanical or friction brakes on the hoist are released by the energization of brake relay BR which occurs as a result of DBR dropping out. The current energizing relay BR flows from bus 61 through normally closed contacts DBR1, lead 79, closed contacts AB3, lead 80, closed contacts HA2, lead 81, closed contacts UV4, lead 82, closed contacts AX5, lead 83 and finally the coil of relay BR. Since the conveyance is loaded and is being hoisted, no overhauling condition exists and the load is motoring. Consequently, the load will not accelerate the hoist above the speed called for by the regulator 47 and appreciable dynamic braking will not be called for. The drop out of relay DBR connects dynamic braking relay DB across bus bars 61 and 62 through normally closed contacts DBR2, HM2, LM2 and leads 76, 77 and 78. As shown in Fig. 4 normally open contacts DB1 and DB2 of relay DB now close to connect dynamic braking exciter DBE across the stator windings of the main motor MM through leads 14 and 15. Normally closed contacts on relays HM and LM between leads 76, 77 and 78 in series with the coil of relay DB prevent the pick up of relay DB in the event that A.C. power may have been applied in error through contacts HM1 or LM1 to the stator windings of the main motor through the closure of either relay HM or LM. Consequently direct current cannot be applied to the main motor stator when it is connected to the A.C. power supply 154.

It will be seen from the above description that the hoist always starts with no A.C. power supplied to the main motor and with the dynamic braking connections closed in readiness to deliver dynamic braking torque if called for. The design of the regulator circuit is however, such that unless the tachometer voltage exceeds the voltage of the reference (Fig. 4), no D.C. voltage will be applied to the main motor stator windings and thus no braking effort will be applied. Hence, if a voltage does not build upon the dynamic braking exciter, relay K will not be energized and its normally open contacts K1 between bus 85 and lead 84 will not be closed. Therefore, on motoring loads, the drop out of timing relay TA will not be interfered with by the closure of relay K which would otherwise prevent TA from dropping out.

After a short time delay, if dynamic braking has not been applied, relay TA times open to transfer the main motor MM from dynamic braking over to a motoring connection to assist the auxiliary motor to accelerate and hoist the load. This is effected as follows: If after 1.5 seconds, K does not close, then TA times out. The normally closed or time-closing contacts TA1 of relay TA between bus 61 and lead 70 close and pick up the dynamic braking relay DBR. Contacts DBR2 of relay DBR between bus 61 and lead 76 then de-energize the dynamic braking relay DB which disconnects the dynamic braking exciter from the main motor stator through the opening of contacts DB1 and DB2. When DBR is energized, the normally open contacts DBR3 of relay DBR between bus 85 and lead 101 close and complete a circuit through the still closed contacts TB1 of relay TB and time closing contacts TA2 of relay TA to lead 99 and then through the closed contact RU4 of relay RU to energize relay HM. When HM is energized, normally open contacts HM1 close and place the main motor stator windings across the A.C. supply 154. The main motor will now assist the auxiliary motor to accelerate the hoist. The function of relay TA is to transfer the main motor from the initial dynamic braking state over to motoring conditions during those trips where the need for a postive motoring torque is proven to exist. Once TA times open the controls cannot return to dynamic braking until the slow-down zone of the speed profile is reached. At the point of slow-down, the normally closed contacts of limit switch L3 are opened by the conveyance passing this point. Consequently the circuit is broken between leads 70 and 71 thereby de-energizing relay DBR. The normally closed contacts DBR2 between bus 61 and lead 76 now close and energize relay DB so that dynamic braking connections to the main motor are made once more for the slow-down period prior to the final stop at the dumping horns.

It is to be noted that limit switches L1 to L4 may be placed in the mine shaft in the positions illustrated in Fig. 3, each being actuated by the conveyance on its approach to a respective switch. Alternately, the limit switches may be incorporated in a mechanically actuated device coupled directly to the hoist drive as, for example, device 31 shown in Fig. 4.

After the run-up button was pressed to raise the hoist, relay TB started timing out. If the dynamic braking exciter DBE supplies a D.C. voltage of sufficient magnitude before relay TA times out, then relay K is energized as described above and TA is prevented from timing out. If relay TA does not time out the normally time-closing contacts TA2 between leads 100 and 99 will remain open and relay HM will not be energized. Consequently A.C. voltage will not be applied to the main motor stator. In the above instance, relay TB will time out after 3.5 seconds instead of relay TA. The timed opening of relay TB allows its contacts TB2 between leads 73 and 74 to open and de-energize relay DBR thus locking the main motor to the dynamic braking source DBE for the duration of the trip.

Assuming that dynamic braking is not called for and TA is allowed to time out, its time closing contacts TA1 between bus 61 and lead 70 close and energize relay DBR. The normally open contacts DBR4 and DBR5 of relay DBR between 85 and 88 and between 86 and 87 respectively close and energize relay 1A, thus closing the main motor contacts 1A1 and 1A2 in resistor bank 34 to put the motor on motoring curve 1 (Fig. 1). Also, normally closed contacts 1A3 between 85 and 102 open and start timing relay 1R timing out.

When timing relay 1R drops out, its contacts 1R1 close thus energizing relay 2A from bus bars 88 and 87 through the following circuit elements: closed contacts 1R1, lead 119, normally closed contacts DB3 and lead 114. Energized relay 2A now closes its contacts 2A1 and 2A2 in resistor bank 34 thereby placing the main motor on characteristic 2, and as a result additional torque is made available for accelerating the hoist. Normally closed contacts 2A3 of relay 2A interrupt the circuit between bus 85 and lead 103 and thus start timing relay 2R timing out. After a short time delay timing relay 2R drops out and relay 3A is energized from bus bars 88 and 87 through contacts 2R1, lead 120, contacts DB4 and lead 116. The driving torque of the main motor is therefore increased further by placing the motor on characteristic 3 through the closure of contacts 3A1 and 3A2 in resistor bank 34. This sequence of relay operation is repeated in such a manner that after a short time delay for each successive step the contacts of relays 4A, 5A and 6A operate in succession.

Once the main motor is on curve 6, the drive runs at top speed until the top slow-down zone is approached, whereupon as described previously, limit switch L3 opens to break the circuit between leads 70 and 71 and de-energizes the coil of relay DBR. The normally open contacts DBR4 and DBR5 between 85 and 88 and between 86 and 87 respectively now open to de-energize bus bars 88 and 87 and thereby break the circuit through secondary relays 1A to 6A. A circuit is now re-established through contacts DBR6 from bus 85 to lead 89 and contacts DBR7 from bus bars 87 to 86 to place the main motor secondary relays under the control of speed relays 1S, 2S and 3S. This operation puts the main motor back on the dynamic braking connections under control of the regulator as previously described. In accordance with the predetermined speed profile the reference voltage now begins to decrease by arm 41 of potentiometer 150 (Fig. 4) moving towards position 152, and if the action of gravity on the hoist is insufficient to produce the desired deceleration rate, the tachometer voltage will rise above the reference voltage indicating that the hoist is running above the desired speed and the regulator will therefore apply the appropriate amount of dynamic braking necessary to correct this situation.

When dynamic braking is called for the speed detector switch 47 shown in Figures 4 and 5 comes into operation. Since the hoist is running at top speed, the "S" speed relays controlling the secondary relays of the main motor will be de-energized thus inserting maximum resistance (all secondary contacts 1A1, 1A2 to 6A1, 6A2 open) in the secondary circuit of the main motor. When the speed drops to around 65% of top speed a pair of contacts in speed switch 47 close to energize relay 1S and normally open contacts 1S1 of relay 1S between leads 89 and 126 close to energize relay 2A. The main motor secondary resistance is thus decreased and the motor's dynamic brake characteristic transfers from the curve illustrated at 10 to that of 11 as shown in Fig. 2. Similarly as the speed falls through approximately 40% and 23% of top speed, speed relays 2S and 3S respectively energize the main motor secondary relays 3A and 4A in succession to give the overall dynamic braking curves. It is to be noted that while the main motor is braking, the auxiliary motor is always delivering a controlled driving torque to the hoist.

As the hoist accelerates up to top speed with the dynamic braking relay DB de-energized, normally closed contacts 1S2 close at about 65% hoist speed to complete a circuit from bus 85 to bus 86 through normally closed contacts 3V1, lead 111, normally closed contacts DB7, lead 110, contacts 1S2 and lead 109 to pick up auxiliary relay AC and hence close its contacts AC1 and AC2 in resistor bank 35 to place the auxiliary motor on characteristic 9 (Figs. 1 and 2). Similarly, as the hoist slows down relay 1S will pick up at approximately 65% of top speed and it will in turn drop out relay AC since normally closed contacts 1S2 between leads 110 and 109 will open, and the auxiliary motor will transfer from characteristic 9 to characteristic 8. During this slow down relay AB remains energized from bus bars 85 and 86 through contacts AX4 which closed on starting and normally closed contact 2V1.

Since the motoring condition of lifting a heavy load is under consideration, the auxiliary motor will be just able, with a safe margin of torque, to drive the load up into the dumping horns with very little braking being applied by the main motor. The skip enters the dumping horns at approximately 5% of top speed and opens limit switch L1 to effect a final stop by dropping out relay RU and thus resetting all circuits to normal inoperative hoist conditions.

*Lowering a load (overhauling torque on the motors)*

The start and acceleration pattern will be essentially the same as for the hoisting case previously discussed, with the following exceptions: (1) The hoist will now tend to accelerate more rapidly due to the driving or motoring action of the auxiliary motor and the action of gravity on the hoist. The auxiliary motor will be operating on characteristic 8 since relays AA and AB are closed by the energizing of relay AX when run-down button 175 is pressed.

(2) The hoist speed will rapidly exceed the slow levelling speed called for by the reference, whereupon the regulator will automatically call upon the main motor to apply sufficient dynamic braking to force the hoist speed to follow that of the reference. The amount of dynamic braking necessary to maintain the hoist speed within the limits of the reference will be directly proportional to the magnitude of the over-hauling torque on the motors. If during the first 1.5 seconds of operation (as defined by the timing out period of timing relay TA) appreciable dynamic braking has been called for by the regulator, the voltage of exciter DBE builds up to the point where relay K picks up, closes its contacts K1 and prevents the timing out of timing relay TA. The timed opening of timing relay TB is unaffected by any of these events; it will time out before TA in this case. Normally open contacts TB1 then open the circuit between leads 101 and 100 before L1 closes the entire trip is completed on dynamic braking of the main motor assisted by the driving torque produced by the auxiliary motor. As indicated previously, once TB times out the main motor is prevented from returning to the motoring condition for the remainder of the trip since the contacts TB2 break the circuit to relay DBR. In addition, the pickup circuit of HM and LM is broken at contacts TB1 between leads 100 and 101 which prevents the energization of either of these relays.

As an additional protective feature, in the event that the hoist reaches top speed before the timed acceleration pattern has been completed, the speed detector switch 47 de-energizes relay SS at or above the synchronous speed of the hoist motors to close its contacts SS1 between bus 88 and lead 118 and thereby energize relay 6A. It is possible that this feature may be of value in the case of a light overhauling load which is not sufficient to pick up relay K.

When making a trip under the control of the dynamic braking regulator, the hoist speed is under the control of the main motor, which is on dynamic braking, from the levelling speed of 5% upwards to top speed, and there is no tendency for a runaway condition to exist as is common practice where a conventional single wound rotor motor drive is used. The hoist accelerates to top speed, whereupon the auxiliary motor, on characteristic 9, is delivering practically no torque (auxiliary motor running at synchronous speed), and the trip is completed making use of the overhauling load to keep the hoist up to speed.

As the conveyance approaches the slowdown point L4, the reference voltage drops and the regulator calls for increased dynamic braking in order to have the conveyance follow the speed profile. If the overhauling load is heavy and the regulator calls for a substantial amount of dynamic braking, say more than 150%, voltage measuring relay 3V connected across the dynamic braking exciter will pick up and transfer the auxiliary motor from characteristic 9 to 8 thus removing about 50% of the torque delivered by the auxiliary motor. The transfer of the auxiliary motor from curve 9 to curve 8 is accomplished by the opening of normally closed contacts 3V1 between bus 85 and lead 111 to de-energize relay AC; the contacts AC3 in turn open the circuit to relay AC and prevents re-energization thereof until contacts DB7 again close when the drive has completed the trip.

As relay AC drops out, timing relay TD begins timing out, and after a delay of approximately 2 seconds, normally closed contacts TD1 of this timer complete a circuit (Figure 4) which connects voltage relay 2V across dynamic braking exciter DBE. Relay 2V in turn functions exactly in the manner of relay 3V in that should the main motor be required to deliver more than 105% of its rated torque, it picks up, opens contacts 2V1 and de-energizes relay AB, thus transfering the auxiliary motor from characteristic 8 to characteristic 7 by the opening of contacts AB1 and AB2 in resistor bank 35 and relieving the main motor of substantial braking torque. The dropout of contactor AB starts timing relay TC timing out, and after a further 2 seconds, voltage relay 1V is connected across the dynamic braking exciter. Secondary relay AA operates through contacts 1V1 under the action of voltage relay 1V as the skip or cage approaches the loading pocket carrying full load in this case; relay 1V is set to pick up when the main motor is delivering somewhere between 100 and 125% dynamic braking torque and hence drops out contactor AA1 and AA2 to open the secondary circuit of the auxiliary motor and prevent it from delivering torque.

It is important to note that when the main motor is under the control of the dynamic braking regulator, the secondary auxiliary motor relays AA and AB are under the control of voltage responsive relays 1V and 2V respectively. If the dynamic braking torque instituted by the regulator exceeds approximately 150% of the nameplate rating of the main motor, AB and AA are de-energized in succession by the respective voltage relays. Voltage relay 1V is set to drop out and reclose relay AA when the dynamic braking torque falls below 60%; voltage relay 2V is set to drop out at 40 to 50% dynamic braking torque and reclose relay AB. Hence, by the action of relays 1V and 2V, the secondary resistance of the auxiliary motor is automatically increased or decreased as necessary to ensure that the dynamic braking regulator is always operating within the torque range of from 40 to 150% of the nameplate rating of the main motor. In other words, the regulating action of relays 1V and 2V keeps the dynamic braking regulator operating in the middle of its range at all times, thus ensuring satisfactory speed control.

Figure 6:
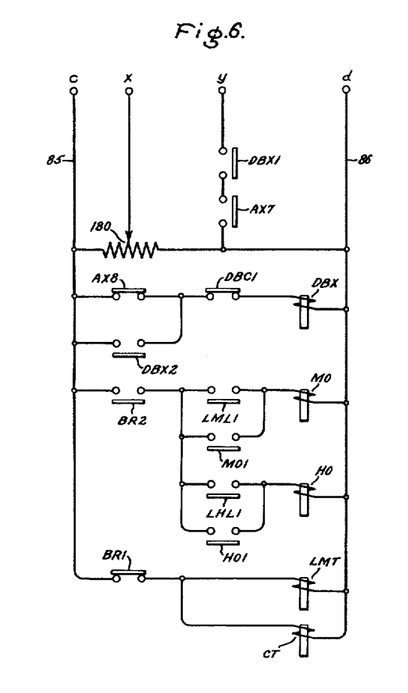
Fig. 6 is a diagram of a circuit which can be used with the system shown in Figs. 4 and 5 to "prime" the drive and thereby provide enhanced initial response to any braking called for by the regulator circuit.
Figure 7:
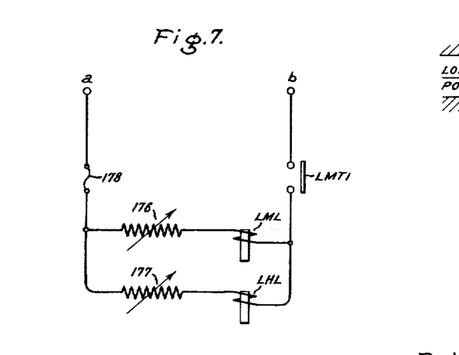
Fig. 7 is a diagram of a load measuring circuit employed to control the drive of Fig. 4 during the "crawl" period following the initial "priming" provided by the circuit of Fig. 6.

In a mine where the shaft is deep, it becomes somewhat impractical to lower heavy overhauling loads throughout the entire trip on dynamic braking since the energy to be absorbed by the main motor resistors 34 becomes very large. It is therefore proposed that, when an overhauling load is being lowered, the auxiliary motor be operated regeneratively to return energy to the supply line 154 rather than to its secondary resistors 35 and thus reduce the amount of dynamic braking which the main motor is called upon to deliver. Figures 6 and 7 illustrate the additional basic circuit elements necessary for such operation of a hoist.

*Compensation for slow regulator operation*

It has been found both difficult and expensive to design a speed regulating system which will respond fast enough to an overhauling load to prevent an appreciable speed overshoot after the hoist has started. To overcome this difficulty, a number of circuit changes may be introduced, and these will now be described with particular reference to Figs. 6 and 7.

It should be appreciated that the job to be done by the speed regulator on the automatic A.C. hoist is much more difficult than that to be done by a corresponding regulator on a D.C. hoist drive. The main reason for this is that with a Ward Leonard system it is only necessary to change the flux in the main generator approximately five percent to drive the hoist all the way from full motoring to full braking torque. However, on an A.C. system the regulator must provide a 100% flux-change in the generator in order to obtain full braking, and for this reason the action of an A.C. regulator will always be slower than that of its D.C. counterpart. To overcome this difficulty and give the regulator time to respond to an overhauling load, a system is proposed whereby flux is permitted to build up in the main motor before release of the friction brakes so that an appreciable quantity of braking torque may be applied quickly by the regulator when called for. Then when the brakes are released and an overhauling load is found to exist, the regulator can apply adequate braking torque in time to prevent serious overshoot of the crawl speed.

As shown in Figure 6 a small reference in the form of a variable resistor 180 is connected across the general purpose exciter GPE to buses 85 and 86 at points c and d (Figure 5) to provide a small D.C. voltage between points x and y. Immediately prior to the release of the release of the brakes this small voltage at X—Y is applied to the magnetic amplifier 16 at terminals 21 and 22 and causes it to circulate a current through the field windings 28 of the dynamic braking exciter DBE. The control system is arranged as in the foregoing description such that the dynamic braking main contactor DB is closed, and consequently a current from the exciter DBE circulates through the windings of the main motor MM. This dynamic braking current also flows through resistor 165 to thereby apply a small voltage across the coil of the dynamic braking current relay DBC. A predetermined current value in resistor 165, energizes relay DBC, which is a signal that an appreciable dynamic braking flux has been established in the main motor stator and it is therefore safe to release the mechanical brakes.

By referring to Figure 6, it will be seen that the voltage at X—Y is applied to the magnetic amplifier through normally open contacts AX7 and DBX1 of relays AX and DBX respectively. When a run button is pressed the relay AX is energized, and as shown in Figure 6 relay DBX is energized at standstill of the hoist. Consequently the small voltage at X—Y is applied to the amplifier as a pulse to circulate dynamic braking current in the main motor primary winding. When relay DBC becomes energized due to a predetermined current flow through resistor 165, thus proving that sufficient current is circulating in the main motor windings, contacts DBC1 open, DBX becomes de-energized and remains so until the end of the trip. Upon DBX becoming de-energized contacts DBX1 open to discontinue the small voltage at X—Y to the magnetic amplifier until the commencement of the next trip.

While the brake pulse, prior to brake release, is an effective means to compensate for slow regulator action, it has the unfortunate aspect that until the regulator recovers from the brake pulse disturbance, the dynamic braking voltage relays 1V, 2V, 3V, may not be used for auxiliary motor torque control. Therefore, some other form of auxiliary motor torque control is necessary. To simplify circuitry and program switching, a system using magnetic timers is proposed. When this modified control system is employed, a crawl timer CT must be added as shown in Figure 6 and it will have normally closed contacts CT1 in series with control circuit 170 between terminals 171 and 169 as shown in Figure 4. When the hoist is standing still and for two to four seconds of crawl, the relay CT is energized thus removing relays K, 1V, 2V and 3V from across the dynamic braking exciter and thus preventing their becoming energized during the dynamic braking proving sequence. As described previously the auxiliary motor is placed on curve 8 prior to the release of the brakes thus ensuring adequate positive torque to move full rated load in the desired direction. In place of the short zones 37a and 38a on cam 36 determining the crawl speed, a small fixed reference is now switched in by means of relays which call for the desired crawl speed. This reference is provided until the crawl timer CT times out in 2 to 4 seconds and after that the drive is allowed to accelerate. With the auxiliary motor on curve 8 and the flux gradually decaying in the magnetic circuit of the main motor, the brakes are released by the drop out of relay DBR and subsequent energization of relay BR. The hoist now accelerates at a rate which is determined chiefly by whether a motoring or overhauling load exists. While the hoist is initially operating under the alternative system of control outlined in the previous paragraph, its speed may be controlled by load measuring relays LML (lowering medium load) and LHL (lowering heavy load) connected across the tachometer T at points a and b as illustrated in Figures 4 and 7. These relays are sensitive to voltage of the tachometer and LML may be set to pick up at approximately one and a half feet per second by means of an adjustable series connected resistor 176 while LHL may be set to pick up at approximately two feet per second by means of series resistor 177. When the brakes are released the timer LMT, shown in Figure 6, is de-energized by the opening of normally closed contacts BR1 and the device times out in about .4 second. With an empty skip being hoisted and with relays LML and LHL correctly adjusted, it is possible for the circuit to operate so that timer LMT cuts both relays off by opening contacts LMT1 before the hoist reaches a sufficient speed to close the load measuring relays LML and LHL. Conversely, if the acceleration is rapid enough, one or more of the load measuring relays will close depending on the degree of overhauling load that exists. A small fuse 178 is placed in the circuit of Figure 7 to prevent burn-out of the relays and the tachometer generator in the event that cotnact LMT1 fails to open.

The load sensing relays LML and LHL have contacts operating into auxiliary relays HO (heavy overhauling load) and MO (medium overhauling load) respectively. It should be noted from the circuit that once the brakes are released (relay BR energized) and relay LML or relay LHL energized that the associated relay MO or HO will also be energized and the latter will remain energized through their respective contacts MO1 and HO1 till the end of the trip regardless of whether LML or LHL drop out again. In fact LHL and LML are de-energized by timer LMT shortly after the trip is initiated. Relays MO and HO now provide a memeory as to the degree of overhauling load that exists.

On the more complicated multi-level installations, in order to simplify the cam gear, the hoist does not accelerate following a cam profile as described with reference to Figures 4 and 5. Instead, acceleration is always by means of magnetic time delay relays as in the standard hoist control. Having two motors available is, in effect, to convert any overhauling load to a motoring load by the application of a fixed amount of dynamic braking torque through the main motor.

Let it be assumed that a heavy overhauling load is about to be lowered. During the starting sequence relay LHL will pick up due to the rapid initial acceleration of the hoist. Relay LHL will energize relay HO through its contacts LHL1, and HO will remain energized till the end of the trip. As previously described for the time interval until the crawl timer CT times out, the speed regulator holds the hoist speed down to a small fixed speed reference which is in no way associated with the cam 36. When the crawl timer CT times out a signal is then fed to the dynamic braking regulator calling for a fixed amount of dynamic braking current. The dynamic braking regulator then holds this value of braking all the way up to full speed, the tachometer generator feed back now playing no part in the operation. In other words, the dynamic braking regulator is now acting purely as a current regulator and holding a fixed amount of braking current (torque) regardless of speed changes. If there is a substantial balance between the overhauling load and braking torque, little or no acceleration will take place. Consequently, when the crawl timer CT becomes de-energized, two to four seconds after the brakes are released, the auxiliary motor is brought into play and its secondary control allowed to bring up its speed. In effect, the auxiliary motor actually drags the hoist up to top speed against a fixed braking torque provided by the main motor. Thus, an overhauling load is apparently converted into a motoring load by the simple artifice of applying a block of fixed braking torque to the main motor, and hence the drive has no tendency to run away from the auxiliary motor as the secondary contactors time out. When top speed is reached during the lowering of such a heavy overhauling load an interlock carried on the last contactor of the auxiliary motor control removes the dynamic braking current from the main motor, and the load is now allowed to drive the auxiliary motor above synchronous speed as an induction generator to feed electric energy back into the supply to thus avoid severe resistor heating.

As the slow down point is passed, the regulator is automatically thrown back to perform its speed regulating function in the manner described in connection with Figure 4 and the hoist then follows the cam down to crawl speed. During slow down the dynamic braking regulator controls the operation and relays 1V, 2V and 3V, which are placed across the dynamic braking exciter, serve to regulate the amount of motoring torque supplied by the auxiliary motor.

The operation of the hoist when lowering a medium overhauling load with LML picked up but LHL de-energized is essentially similar in that the main motor is again called upon to supply a fixed block of braking, and the auxiliary motor is allowed to time out against it thus converting the load into an apparent motoring load.

*Handling the one level trip*

A little thought will show that with the circuit arranged as described above, it is now possible, without complicated cam gears, to handle a one level trip where the distance to be travelled is less than two slow down zones. During such a trip the hoist will not reach top speed before it is again required to slow down to come into the desired landing. To accomplish this, there may be incorporated in the cam gear 45 an arrangement of contacts such that when a trip is initiated in which the slow down signal is received before the hoist gets to top speed, a relay picks up and thereby decreases the reference current flowing through the reference potentiometer 150 shown in Figure 4. It is to be appreciated that when the reference current through this potentiometer is reduced that the speed which the reference is calling for is correspondingly reduced. Consequently, if the reference current is reduced to half its normal value then the regulator will in effect call for a speed profile of half its former speed but the slow down zone will remain unchanged. If the trip is actually initiated inside the slow down zone the hoist will be on speed regulated operation all the way. When the slow down point is passed through, the hoist is allowed to accelerate along the particular speed profile selected and since the reference voltage provided by the cam operated potentiometer is higher than that of the tachometer generator no dynamic braking will be applied. The crawl timer CT is de-energized and consequently relays 1V to 3V will be connected with the dynamic brake exciter. During the initial run up to the speed profile the dynamic braking exciter will not be delivering voltage, relays 1V to 3V will be de-energized and consequently, the auxiliary motor will be allowed to apply torque. Since the current in reference circuit including elements 150 and 160 is reduced there will be rapid acceleration to half normal speed, and consequently, in a matter of seconds, dynamic braking will commence and the regulator will again take over to bring the hoist in to the desired landing. It is to be appreciated that the secret of success in this operation revolves around a sufficient reduction in reference current so that at no time in the trip does the hoist speed exceed approximately a third of normal speed. Although the initial acceleration may be fairly rapid it can be tolerated even on a cage hoist. Even though the regulator may allow the hoist to overshoot somewhat as it takes over, this is valuable in that it is also calling for a reduced speed profile so that no overshoot of the desired landing can possibly result.

*The jogging operation*

The description so far does not show the jogging feature which is desirable on most mine hoist drives. The jogging feature may take the form of a means to prevent the timing out of relay CT and such means may be jog-up or jog-down buttons closing the appropriate hoisting or lowering contactor. In other words, a trip is initiated, dynamic braking current circulated, etc. but since CT is not allowed to time out the hoist never accelerates to go anywhere and stops as soon as the finger is removed from the jog button.

What I claim as new and desire to secure by Letters Patent of the United States is:

1. A reversible drive adapted to deliver torque substantially independent of speed throughout the normal speed and torque range thereof; said drive comprising two wound rotor induction motors mechanically coupled to drive a common load, one motor developing torque in the sense to drive the load while a second of said motors develops torque in the sense to hold the speed of the load within definite limits of a predetermined program of desired speeds; means to generate a first signal representing the desired speed of the load as defined by said program; means to generate a second signal proportional to the actual speed of the load; means to compare said signals and thereby establish an error signal which represents the deviation in speed from that called for by the program; an amplifier to amplify said error signal; a D.C. generator, means to utilize the amplified signal to control the excitation of said generator and means to apply the output of said generator to control said second motor selectively to develop either a motoring torque or a braking torque to maintain said load at a speed substantially in accordance with said program.

2. A hoist drive adapted to deliver torque substantially independent of speed throughout the normal speed and torque range thereof; said drive comprising two wound rotor induction motors mechanically coupled to drive a common load, a first motor developing torque in the sense to drive the load either up or down, while the second develops either driving or braking torque whichever necessary to hold the speed of the load within definite limits of a predetermined program of desired speeds; a bank of variable resistors in the secondary circuit of each motor; a potentiometer for developing a unidirectional voltage of given polarity which represents said speed program, cam means connected to be driven by said motors and provided with a contour defining said program, said potentiometer being actuated by said cam means, a tachometer driven by said drive for generating a unidirectional voltage of opposite polarity proportional to the actual speed of said drive; means to compare said voltages and thereby establish an error voltage which represents the deviation in speed of the load from that called for by the program, a D.C. generator, an amplifier for amplifying said error voltage and applying the output thereof to control the excitation of said generator; and means to apply the output of said generator to said second motor to effect controlled variable dynamic braking thereof.

3. A host drive adapted to deliver torque substantially independent of speed throughout the normal speed and torque range thereof; said drive comprising two wound rotor induction motors mechanically coupled to drive a common load, one motor developing torque in the sense to drive the load either up or down, while the other develops either driving or braking torque whichever necessary to hold the speed of the load within definite limits of a predetermined program of desired speeds; a bank of variable resistors in the secondary circuit of each motor; cam means driven by said motors and provided with a contour defining said program, a potentiometer for developing a unidirectional voltage of given polarity which represents said speed program, said potentiometer being actuated by said cam means, a tachometer driven by said drive for generating a unidirectional voltage of opposite polarity proportional to the actual speed of said drive; means to compare said voltages and thereby establish an error voltage which represents the deviation in speed of the load from that called for by the program; amplifying means for amplifying the error voltage representing a speed in excess of that called for by the program but rejecting any error voltage representing a speed below that called for by the program; a D.C. generator having a shunt field excited by the output from said amplifying means, the output voltage of said generator being zero when the output from said amplifying means is zero; means to apply the output of said generator to the primary winding of said other motor for dynamic braking thereof; and control means to initiate switching of said other motor from motoring to dynamic braking or from dynamic braking to motoring as necessary to maintain the speed of the load within the limits defined by the program.

4. A drive as defined in claim 3 characterized by said other motor applying driving torque in response to no voltage from said generator when the load is being hoisted.

5. In a drive as defined in claim 3, means responsive to the speed of the drive and means responsive to the output voltage of said generator for jointly controlling the dynamic braking of said other motor.

6. A drive as defined in claim 3 wherein, during dynamic braking by said other motor, said speed responsive means automatically varies the secondary resistance of said other motor as a function of speed thereof such that said other motor develops substantially maximum torque for any given speed; and wherein are provided means responsive to the voltage output of said generator to vary the resistance in the secondary of said one motor as a function of generator voltage thereby to maintain the motor operation at a torque substantially maximum for any given speed.

7. In a drive as defined in claim 3, relay means responsive to the voltage output of said generator when said other motor is connected to deliver dynamic braking for controlling the resistors in the secondary circuit of said one motor.

8. A hoist drive adapted to deliver torque substantially independent of speed throughout the normal speed and torque range thereof; said drive comprising two wound rotor induction motors mechanically coupled to drive a common load, one motor developing torque in the sense to drive the load either up or down, while the other develops either driving or braking torque whichever necessary to hold the speed of the load within definite limits of a predetermined program of desired speeds; a bank of variable resistors in the secondary circuit of each motor; cam means coupled to said motors and provided with a contour defining said program, a potentiometer for developing a unidirectional voltage of given polarity which represents said speed program, said potentiometer being actuated by the drive through said cam means; a tachometer driven by said motors for generating a unidirectional voltage of opposite polarity proportional to the actual speed of said drive; means to compare said voltages and thereby establish an error voltage which represents the deviation in speed of the load from that called for by the program; amplifying means for amplifying the error voltage representing a speed in excess of that called for by the program but rejecting any error voltage representing a speed below that called for by the program; a D.C. generator having a shunt field excited by the output from said amplifying means, the output voltage of said generator being zero when the output from said amplifying means is zero; circuit means connecting the output of said generator to the primary of said other motor; switching means for selectively connecting the primary of said other motor to an A.C. supply of motoring current or to said generator for receiving D.C. dynamic braking current; means responsive to the voltage output of said generator for varying the resistance in the secondary of said one motor, the resistance decreasing with an increase in voltage; and means responsive to the speed of the drive for shunting out the resistance in the secondary of said one motor at a predetermined speed and simultaneously therewith decreasing the resistance in the secondary of said other motor with increase of speed during dynamic braking of the latter.

9. A drive as defined in claim 8 wherein a predetermined small amount of resistance is always in the secondary circuit of said one motor when the voltage output of said generator is zero thereby to permit said one motor to develop substantial torque for starting the load.

10. In a drive as defined in claim 8, a mechanical brake for said motors; means for initiating the release of the mechanical brakes on the drive and simultaneously connecting the generator output in circuit with the primary of said other motor.

11. A drive as defined in claim 10 wherein a timing means is provided to transfer the primary of said other motor to an A.C. supply line after a predetermined lapse of time when the voltage of said generator remains zero; and relay means energized by a predetermined voltage of said generator for preventing said timing means from timing out.

12. A hoist drive adapted to deliver torque substantially independent of speed throughout the normal speed and torque range thereof; said drive comprising two wound rotor induction motors mechanically coupled to drive a common load, one motor developing torque in the sense to drive the load either up or down, while the other develops either driving or braking torque whichever necessary to hold the speed of the load within definite limits of a predetermined program of desired speeds; a bank of variable resistors in the secondary circuit of each motor; cam means driven by said motors and having a profile which defines said program, a potentiometer for developing a varying unidirectional voltage of given polarity which represents said speed program, said potentiometer being actuated by the drive through said cam means; a tachometer driven by said motors for generating a unidirectional voltage of opposite polarity proportional to the actual speed of said motors; means to compare said voltages and thereby establish an error voltage which represents the deviation in speed of the load from that called for by the program; amplifying means for amplifying the error voltage representing a speed in excess of that called for by the program but rejecting any error voltage representing a speed below that called for by the program; a D.C. generator having its shunt field excited by the output from said amplifying means, the output voltage of said generator being zero when the output from said amplifying means is zero; circuit means for applying either A.C. from a supply line or D.C. from said generator to the primary of said other motor; means to place a predetermined small amount of resistance in the secondary circuit of said one motor in response to zero voltage output of said generator; means to decrease the resistance in the secondary circuit of said other motor in successive steps, with a lapse of time between each step, when a load is being hoisted and when the voltage output of said D.C. generator is zero; and means to transfer the primary of said other motor to the output of said generator and to transfer control of the secondary resistance of said other motor to a speed responsive control means when the program calls for either stopping or starting of the load.

13. A drive as defined in claim 3 wherein, during dynamic braking by said other motor, means responsive to the speed of the drive automatically varies the secondary resistance of said other motor as a function of speed thereof such that the motor develops substantially maximum torque for any given speed; and means responsive to the voltage output of said generator to vary the resistance in the secondary of said one motor in a predetermined relationship to said generator voltage, an increase in voltage causing an increase in resistance and hence a reduction in motor torque.

14. A hoist drive adapted to deliver torque substantially independent of speed throughout the normal speed and torque range thereof; said drive comprising two wound rotor induction motors mechanically coupled to drive a common load, one motor developing torque in the sense to drive the load either up or down, while the other develops either driving or braking torque whichever necessary to hold the speed of the load within definite limits of a predetermined program of desired speeds; a bank of variable resistors in the secondary circuit of each motor; cam means driven by said motors and having a profile which defines said program; a potentiometer for developing a unidirectional voltage of given polarity which represents said speed program, said potentiometer being actuated by the drive through said cam means; a tachometer driven by said motors for generating a unidirectional voltage of opposite polarity proportional to the actual speed of said drive; means to compare said voltages and thereby establish an error voltage which represents the deviation in speed of the load from that called for by the program; amplifying means for amplifying the error voltage representing a speed in excess of that called for by the program but rejecting any error voltage representing a speed below that called for by the program; a D.C. generator having its shunt field excited by the output from said amplifying means, the output voltage of said generator being zero when the output from said amplifying means is zero; circuit means for applying D.C. from said generator to the primary of said other motor; means to apply a small D.C. reference voltage to said amplifying means on initiating operation of the drive before the brakes thereon release, said reference causing said generator to circulate current through the primary of said other motor and thereby place it in readiness to deliver dynamic braking torque if called for; and means responsive to a predetermined current flow from said generator to interrupt the circuit supplying said reference voltage to said amplifying means.

15. A hoist drive adapted to deliver torque substantially independent of speed throughout the normal speed and torque range thereof; said drive comprising two wound rotor induction motors mechanically coupled to drive a common load, one motor developing torque in the sense to drive the load either up or down, while the other develops either driving or braking torque whichever necessary to hold the speed of the load within definite limits of a predetermined program of desired speeds; a bank of variable resistors in the secondary circuit of each motor; cam means driven by said motors and having a contour defining said program, a potentiometer for developing a varying unidirectional voltage of given polarity which represents said speed program, said potentiometer being actuated by said cam means; tachometer driven by said motors for generating a unidirectional voltage of opposite polarity proportional to the actual speed of said drive; means to compare said voltages and thereby establish an error voltage which represents the deviation in speed of the load from that called for by the program; amplifying means for amplifying the error voltage representing a speed in excess of that called for by the program but rejecting any error voltage representing a speed below that called for by the program; a D.C. generator having its shunt field excited by the output from said amplifying means, the output voltage of said generator being zero when the output from said amplifying means is zero; circuit means for applying D.C. from said generator to the primary of said other motor; means to apply a small D.C. reference voltage to said amplifying means on initiating operation of the drive before the brakes thereon release, said reference causing said generator to circulate current through the primary of said other motor and thereby place it in readiness to deliver dynamic braking torque if called for; and means responsive to a predetermined current flow from said generator to interrupt the circuit supplying said reference voltage to said amplifying means; a plurality of voltage responsive relays connected across the output of said generator; means to place a predetermined small amount of resistance in the secondary circuit of said one motor in response to zero voltage output of said D.C. generator; a crawl timer for disconnecting said relays from said generator when the driven is stationary and then re-establishing the circuit at a definite time after the release of the brakes of the drive; and means to control the crawl speed of the drive independently of the programming device, which means is de-energized by the timing out of said crawl timer.

16. A drive as defined in claim 15 wherein there is provided further means to control the speed of the drive during deceleration thereof down to the constant speed range of the program, said further means comprising a circuit interrupter to remove said error voltage from said amplifying means; means to feed a signal to said amplifying means calling for a fixed amount of dynamic braking current; and circuit means to place the secondary resistance of said one motor under the control of said relays after the timing out of said crawl timer.

17. A drive as defined in claim 15 wherein there is provided further means to control the speed of the drive during the lowering of the load to the slow-down point on said program, said further means comprising a circuit interrupter to remove said error voltage from said amplifying means; means to feed a signal to said amplifying means calling for a fixed amount of dynamic braking current; circuit means to place the secondary resistance of said one motor under the control of said relays after the timing out of said crawl timer; means to vary the resistance in the secondary of said other motor in predetermined relationship to the speed of the drive; and means to remove the dynamic braking current from said other motor at substantially synchronous speed of said one motor and thereby allow the load to drive the latter as an induction generator to feed electric energy back into the supply lines.

18. A hoist drive adapted to deliver torque substantially independent of speed throughout the normal speed and torque range thereof; said drive comprising two wound rotor induction motors mechanically coupled to a load, a first motor developing torque in the sense to drive the load either up or down, while the second delivers either driving or braking torque whichever is necessary to hold the speed of the load within definite limits of a predetermined program, means to generate a first signal representing the desired speed of the load as defined by said program, means to generate a second signal proportional to the actual speed of said load, means to compare said signals and thereby establish an error signal which represents the deviation in speed of the load from that called for by the program and a regulating system responsive to said error signal for controlling said second motor selectively to develop either a motoring torque or a braking torque to maintain said load at a speed substantially in accordance with said program, said regulating system including an amplifier for amplifying said error signal, D.C. generator whose excitation is controlled by the output from said amplifier, and means to utilize the output of said generator to control said motors.

References Cited in the file of this patent
UNITED STATES PATENTS

| | | |
|---|---|---|
| 1,022,908 | Whiting | Apr. 9, 1912 |
| 2,691,751 | Schaelchlin | Oct. 12, 1954 |